June 10, 1958 — L. S. DANIELS — 2,838,381
MOVING BED REACTOR
Filed April 1, 1953 — 3 Sheets-Sheet 1
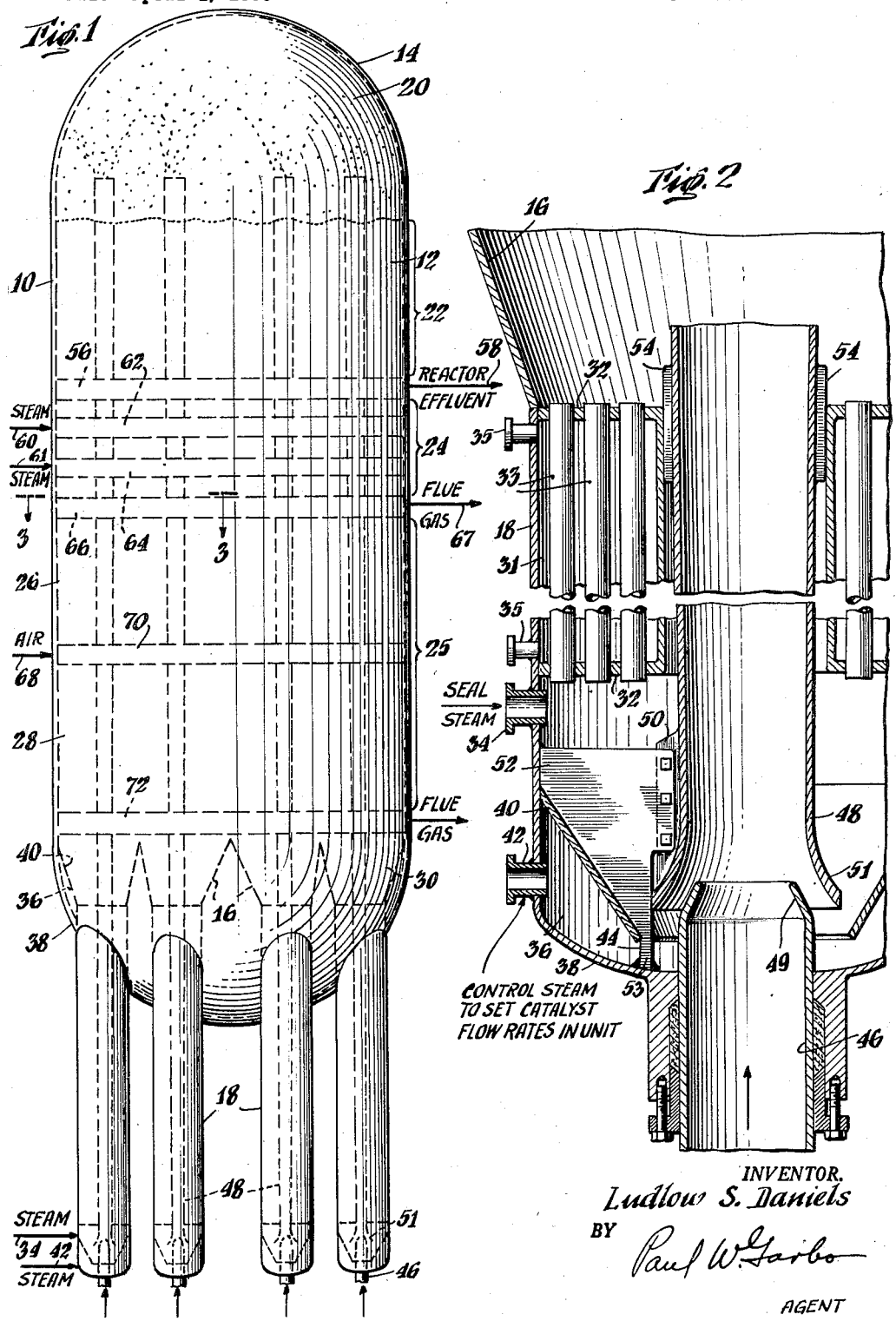
INVENTOR.
Ludlow S. Daniels
BY Paul W. Garbo
AGENT

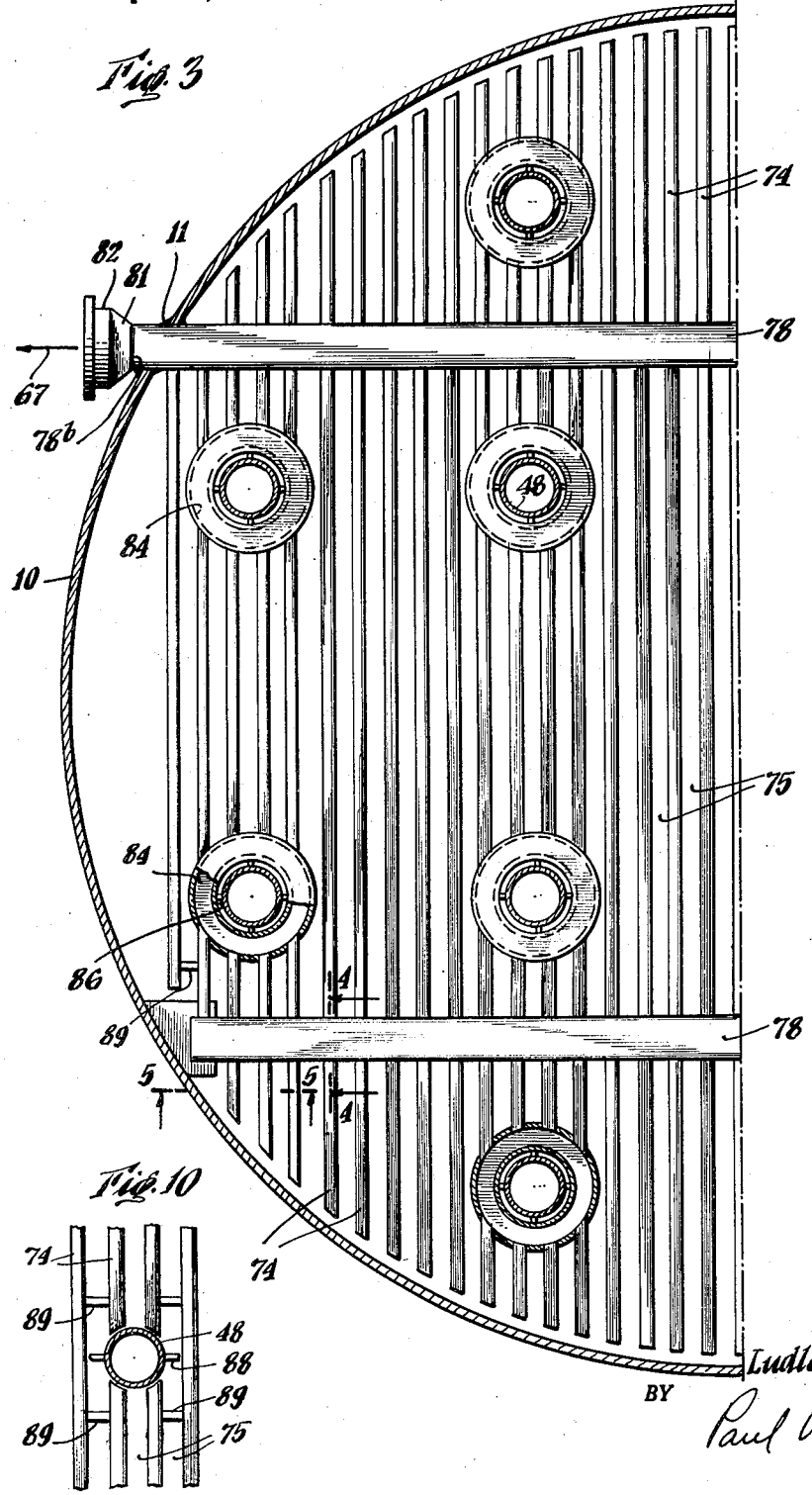

June 10, 1958 — L. S. DANIELS — 2,838,381
MOVING BED REACTOR
Filed April 1, 1953
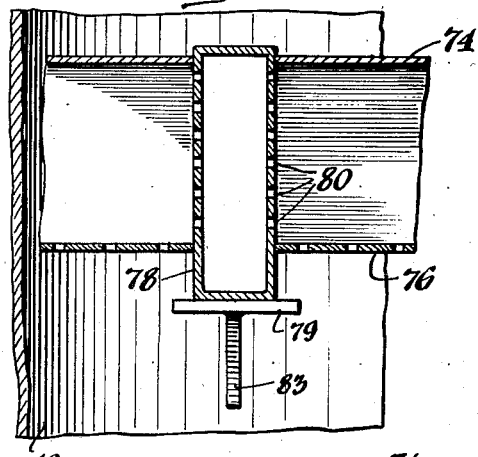
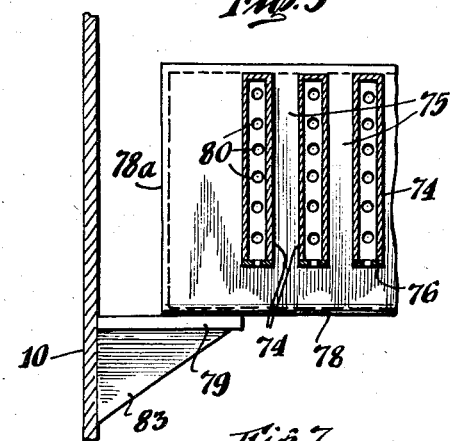
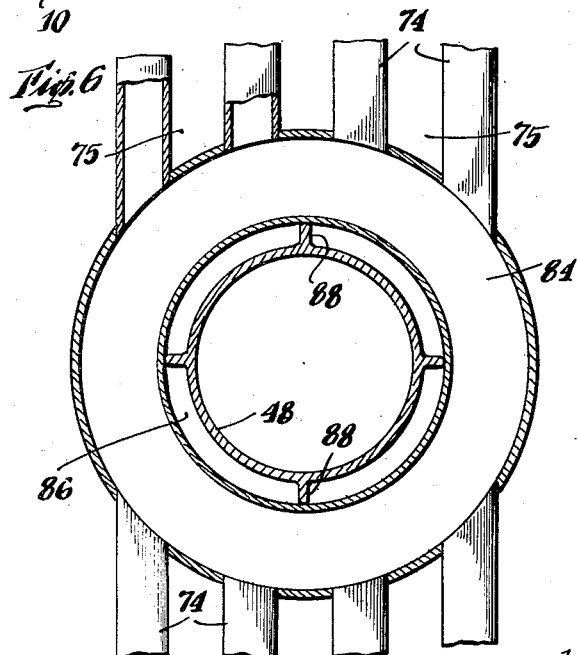
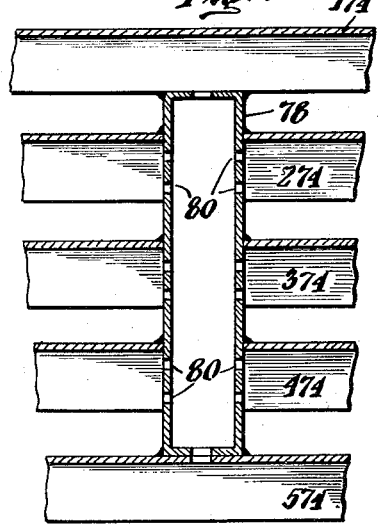
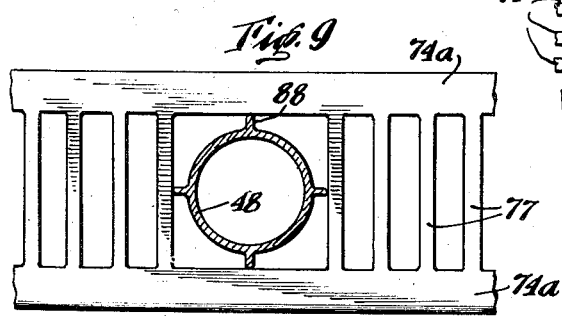
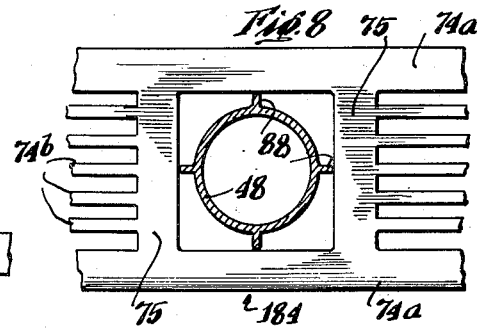
INVENTOR.
Ludlow S. Daniels
BY
AGENT United States Patent Office 2,838,381
Patented June 10, 1958

2,838,381

MOVING BED REACTOR

Ludlow S. Daniels, New York, N. Y., assignor to Hydrocarbon Research, Inc., New York, N. Y., a corporation of New Jersey Application April 1, 1953, Serial No. 346,131

6 Claims. (Cl. 23—288)

This invention relates to an improved reactor for carrying out catalytic cracking of hydrocarbons in which a bed of granular catalyst, as distinguished from a fluidized body of catalyst, is used; more particularly, this invention relates to a high capacity reactor vessel.

In a moving bed reactor exceeding 10 feet in diameter, the conduit lifting catalyst from the bottom of the reactor to near its top conventionally discharges into a receiving chamber having special catalyst distribution elements for uniformly spreading catalyst across the top of the bed. The complexity of this structure makes it economically unfeasible to build larger reactors, e. g., 20 feet or more in diameter.

A similar difficulty equally magnified as reactor size increases lies in the decks separating the cracking and regenerating zones. Each deck is provided with gas inlet or outlet means and is designed to permit the flow of catalyst through the deck and the even distribution of the catalyst over the top surface of the bed in the zone below the deck. The fact that the catalyst uplift conduit traverses the decks further complicates the design of the decks of large reactor vessels, particularly if several uplift conduits seem desirable.

An object of this invention is to provide a reactor vessel having therein a plurality of catalyst uplift conduits which pass through the deck structures without causing disturbance in their functions.

A further object is to provide a simplified and narrow deck structure which cooperates with the uplift conduits and allows catalyst to flow uniformly therethrough while acting as the means for introducing or withdrawing a gasiform stream.

Additional objects and advantages of the invention will appear from the description which follows.

Briefly stated, this invention comprises a moving bed reactor having interiorly thereof a plurality of pneumatic catalyst lift conduits extending substantially vertically from near the reactor bottom to near the reactor top and laterally spaced from one another in a pattern whereby catalyst discharging from the several uplift conduits is spread uniformly across the top of the downwardly moving bed. Several substantially horizontal decks are disposed within the reactor in spaced relationship to each other and provide lateral support for the uplift conduits which are fastened only at their lower end portions. Each deck comprises at least one hollow box beam having its opposite ends supported by the vertical walls of the reactor vessel and a multiplicity of spaced, rectilinear hollow members extending generally at right angles to the box beam and in fluid communication therewith. A port in the vertical wall of the reactor is disposed opposite one hollow end of the box beam so that a gaseous stream may be introduced into the beam, thence distributed into the several hollow members, and discharged by way of apertures along the lengths of these hollow members uniformly over the entire horizontal cross-section of the reactor. Conversely, a gaseous stream may be drawn through these apertures into the hollow members, thence into the box beam and finally withdrawn from the reactor by way of the port in the wall thereof. The reactor of this invention is particularly valuable for moving bed operations requiring vessels with diameters of 20 feet and more.

For a fuller understanding of the invention, reference is now made to the accompanying drawings wherein:

Figure 1 is a schematic elevation of a reactor embodying the present invention;

Figure 2 is an enlarged sectional elevation of one of the legs depending from the bottom of the reactor illustrated in Figure 1;

Figure 3 is an enlarged plan view taken along the line 3—3 of Figure 1;

Figure 4 is an enlarged partial section taken along the line 4—4 of Figure 3;

Figure 5 is an enlarged partial section taken along the line 5—5 of Figure 3;

Figure 6 is an enlarged partial plan view of the deck structure shown in Figure 3, taken in the vicinity of an uplift conduit.

Figure 7 is a view similar to Figure 4 illustrating a modified deck structure;

Figure 8 is a view similar to Figure 6, on a smaller scale, showing a modification of the deck pattern in the vicinity of an uplift conduit;

Figure 9 like Figure 8 illustrates still another deck pattern around an uplift conduit;

Figure 10 like Figures 8 and 9 shows an additional modification of the deck structure of this invention.

The moving bed reactor of Figure 1 comprises an upright cylindrical vessel 10 containing a moving bed of catalyst 12. Vessel 10 is closed at the top by a dished head 14 and has in its bottom portion a plurality of truncated cones 16 from which depend tubular legs 18. Inside vessel 10, catalyst particles fall from a vapor chamber 20 onto the downwardly moving bed 12 of catalyst. The particles in bed 12 flow successively through a reaction zone 22, a stripping zone 24, a regeneration zone 25 divided into an upper regeneration section 26 and lower regeneration section 28, and a second stripping zone 30 in one of the legs 18.

As illustrated in Figure 2, each leg 18 contains an annular waste heat boiler 31 having two spaced tube sheets 32 and a plurality of tubes 33 through which the catalyst flows. Ports 35 are used to introduce and withdraw the heat transfer medium circulated around tubes 33. Seal steam introduced through inlet 34 just below the lower tube sheet 32 passes up through tubes 33 in countercurrent stripping contact with the catalyst thereby preventing entry of regeneration gases into the bottom of leg 18. The reduced flow area of tubes 33 simplifies catalyst stripping and allows efficient sealing by a small quantity of seal steam. Beneath the point of seal steam introduction is an annular steam chest 36 formed by the side wall of leg 18, its bottom 38 and imperforate annular skirt 40. Control steam enters through inlet 42 and exits from chest 36 through the annular space 44 left between the lower edge of skirt 40 and bottom 38 of leg 18. Oil inlet 46 entering leg 18 through a suitable connection in bottom 38 extends axially past annular space 44 and ends just inside the lower end of pneumatic lift conduit 48 in an inwardly flared nozzle 49 while the lower end of lift conduit 48 has an outward flaring 51. The control steam from chest 36 flowing through annular space 44 entrains catalyst from the bottom of leg 18, carrying it through the annular opening between the flaring 51 of lift conduit 48 and the nozzle 49 of oil inlet 46 into lift conduit 48 where together with oil entering from inlet 46 in liquid and/or vapor phase it pneumatically transports the catalyst upwardly.

As shown in Figure 1, each lift conduit 48 terminates at a level above the top of catalyst bed 12 but spaced from head 14 of vessel 10. Accordingly, lifted catalyst is discharged into vapor chamber 20. The size, number and spacing of list conduits 48 depend on the diameter of vessel 10, generally being such as to provide substantially uniform distribution of catalyst across the top surface of bed 12. For example, a vessel 35 feet in diameter, adapted to crack 60,000 barrels per day of oil, would desirably have twelve lift conduits 48 (Fig. 3), each about 12 inches in diameter at the bottom expanding to 18 inches at the top.

Closed head 14 forces gasiform hydrocarbon products to flow from vapor chamber 20 down into catalyst bed 12 through reaction zone 22. The gasiform products are collected in deck 56 and removed through outlet 58. All the decks through substantially identical in construction, can serve equally to withdraw or introduce gases. Thus, steam is introduced through inlets 60 and 61 into stripping zone 24 through decks 62 and 64, respectively. Here advantage is taken of the deck structure to strip the catalyst efficiently while preventing admixture of regeneration gases with the hydrocarbon products. By and large, steam entering the catalyst mass from deck 62 exits through deck 56 in admixture with the gasiform hydrocarbon products, while steam from deck 64 exits through deck 66 and outlet 67 in admixture with flue gas from regeneration zone 25. Similarly, air from line 68 enters regeneration zone 25 through a deck 70 which serves also to divide regeneration zone 25 into upper section 26 and lower section 28. Part of the flue gas produced by regeneration exits through deck 66, while the rest exits through deck 72 in admixture with sealing steam rising through legs 18 and introduced by way of inlets 34.

The multiplicity of rectilinear hollow members of each deck (Figs. 3 to 10) are basically channels 74, preferably formed with an imperforate top and side walls and having an open or perforate bottom. The configuration of channel 74 may be varied considerably. For example, the bottom may be partially sealed by a plate-like member 76; the top may be peaked or slanted (not shown); and the side walls may be perforate or slotted (not shown). Each deck comprises a set of substantially parallel channels 74, spaced apart sufficiently to allow the catalyst to flow down intervening slots 75. A pair of box beams 78 disposed substantially at right angles to channels 74 support the entire deck structure within vessel 10. The opposite ends of each box beam 78 are supported by the walls of vessel 10. At the connections between channels 74 and beams 78, slots or other openings 80 in the side walls of beams 78 allow gas to flow between channel and beam. One end of each beam 78 communicates with a port 82 through the wall of vessel 10 while the other end is suitably closed off. Since all the channels 74 like beams 78 are structural members, their depth and thickness are determined largely by the catalyst load superimposed on them. For example, the deck channels for a vessel with a 35-foot diameter may be 2 feet deep. The width and spacing of these deck channels depend on the relative vapor and catalyst loadings at each deck. For a 35-foot vessel, beam 78 may be 3 feet deep, and by disposing both channels and beams in the same general plane, the vessel height taken up by each deck is made a minimum.

During operation of the reactor, catalyst and vapors repassing down from zone 22 flow through slots 75 of deck 56. Just below the level of channels 74, vapors disengage from the catalyst, pass into channels 74, flow longitudinally along each channel, enter beam 78 through openings 80, and exit finally through outlet 58. Control over the amount of vapor entering along the length of each channel 74 may be achieved by closing the bottom with a plate 76 having graded orifices at spaced points along its length. For disengaging vapor uniformly throughout the horizontal cross-section of the vessel 10, each orifice will be sized in proportion to the linear distance the vapors passing through it must travel along channel 74 and beam 78. Likewise, the openings 80 in the side walls of beams 78 may be sized according to their distances from outlet 58. Similarly, graded orifices or openings may be used in the other decks in vessel 10. Thus, each deck serves to add or remove gasiform materials uniformly over the entire horizontal cross-section of vessel 10.

At the locations where lift conduits 48 traverse a deck, the rectilinear regularity of parallel channels 74 is interrupted. Two or more channels 74 may merge in a unitary ring channel 84 which is made wider than a channel 74 because several such channels 74 discharge into ring channel 84. Lift conduit 48 is disposed concentrically in ring channel 84 (Fig. 6), leaving an annular slot 86 for catalyst flow. Guides 88 attached to the outer surface of lift conduits 48 maintain generally the concentric position of lift conduit 48. Conduit 48 with its guides 88 fits loosely in ring channel 84 so that upon expanding or contracting with temperature changes conduit 48 can slide freely up or down through ring channel 84 without in any way stressing the deck structure.

There are two noteworthy advantages in the constructional features of rectilinear slots 75 and annular slots 86. The arrangement of these deck slots over the entire horizontal cross-section of vessel 10 effects an even distribution of catalyst through the deck to the next lower zone in vessel 10. Also, the total free area of the slots is a substantial fraction of the horizontal cross-section of vessel 10, usually of the order of 50%. Therefore, the weight of catalyst on the deck is to that extent transmitted through the slots to the catalyst mass beneath the deck, and similarly through the other decks to the reactor bottom. Since each deck bears only part of the catalyst load above it, the deck can be made that much lighter in construction.

Where it may be desired to achieve better stripping or more accurate control of vapor disengagement, a modified deck may be used. Figure 7 illustrates a deck structure supported by box beam 78 and having several layers of deck channels. The uppermost layer of channels 174 rest on beam 78. Beneath channels 174 are three successive layers of channels 274, 374 and 474 which are joined to the side walls of box beam 78. A lowermost layer of channels 574 is fastened to the bottom of beam 78. The fluid communication of channels 274, 374 and 474 with box beam 78 is like that of channels 74 in Figures 4 and 5. Similarly, apertures in the top and bottom plates of box beam 78 are aligned with apertures in channels 174 and 574, respectively, so that there is fluid flow between the uppermost and lowermost layers of channels and box beam 78. Although it is generally preferred to have a uniform pattern of deck slots 75, the slots of each layer of channels may differ from the slots of other layers, e. g., in width, and the slots of one layer may be vertically offset or staggered relative to the slots of an adjacent layer.

It is clear that the several decks and lift conduits cooperate in achieving uniform distribution of the catalyst over the entire horizontal cross-section of the reactor, thereby ensuring uniform catalytic reaction and catalyst regeneration.

The lift conduits 48 (Fig. 2) fit loosely in their respective annular waste heat boilers 31 and have guides 54 to permit movement with thermal expansion and contraction in the same manner in which these conduits extend through the ring channels 84 of the several decks. Lift conduits 48 are thus structurally independent of waste heat boilers 31 and all the decks. This leaves the decks and lift conduits free to expand and contract during starting up and shutting down operations without damage to each other. Each lift conduit 48 is anchored only near its bottom by a plurality of radial ribs 50 (Fig. 2) which are bolted to radial ribs 52 projecting toward conduit 48 from the walls of leg 18; each radial rib 52 has a tab or foot 53 attached to the bottom 38 of leg 18 for greater structural strength.

Figure 8 shows that the ring channel 84 of Figure 6 may be replaced by a box channel 184 formed by two parallel channels 74a and two cross channels 75 joined to channels 74a at right angles thereto. A plurality of channels 74b, parallel to channels 74a, discharge into cross channels 75. Box channel 184 is generally made wider than channels 74b because it handles the fluid flow of several channels 74b.

Figure 9 presents another deck pattern in the vicinity of an uplift conduit 48. In this design, the parallel channels 74a act as headers or collectors for a plurality of narrower, short cross channels 77.

Figure 10 illustrates still another way in which the channels 74 may be interrupted in the vincinity of an uplift conduit 48. The interrupted channels may be provided with cross-bars 89 that hold the interrupted channels to adjoining continuous channels for greater deck strength. Cross-bars 89 may be hollow and function like the cross channels 77 of Figure 9.

Figure 5 shows a simple form of support for the closed or dead end 78a of box beam 78. Support plate 79 is fastened to the wall of vessel 10 and is reinforced by a bracket 83. Beam 78 rests on plate 79 and is free to slide on plate 79 to accommodate any change of length of beam 78 resulting from temperature changes. Those channels 74 which have only one end joined to a box beam 78 may have the opposite dead end supported at the wall of vessel 10 in much the same manner just described for the dead end 78a of beam 78.

The open end 78b of box beam 78 opposite the dead end 78a is shown in Figure 3 projecting through the wall of vessel 10 and fastened thereto in a fluid-tight joint 11. The open end 78b of beam 78 which has a rectangular periphery is joined by a transition section 81 to a cylindrical flanged port 82. Thus, conventional piping may be connected with box beam 78 through flanged port 82.

The several lift conduits 48 give the reactor an unusually large range of operation. If, for any reason, the oil supply falls far below rated reactor capacity, complete shut-down may be avoided by halting the oil feed to some of the lift conduits 48 and operating with the others. If desired, some of the lift conduits 48 may be even closed off completely; in such event, not only the flow of oil through inlet 46 is stopped but also the supply of control steam through inlet 42 is cut off, thereby stopping further entrainment of catalyst into that uplift conduit 48.

In view of the various modifications of the invention which will occur to those skilled in the art upon consideration of the foregoing disclosure without departing from the spirit or scope thereof, only such limitations should be imposed as are indicated by the appended claims.

What is claimed is:

1. A moving bed reactor comprising a vertically disposed cylindrical vessel exceeding 20 feet in diameter closed at its upper end, terminating at its lower end in a plurality of dependent hollow legs, and having at least one fluid-conveying deck comprising at least one box beam with a multiplicity of spaced parallel rectilinear channels connected at substantially right angles to and in fluid communication with said box beam and extending horizontally across said vessel, said channels being in fluid communication with said vessel, a fluid port in a wall of said vessel in fluid communication with said deck, a vertical uplift open conduit disposed in each of said legs extending from near the bottom end of each said leg through said deck to near the upper end of said vessel, each said uplift conduit being fastened solely by its bottom end to the bottom end of its respective leg with its walls and said bottom end spaced from the walls and bottom end of said respective leg, a fluid inlet disposed in the bottom end of each said leg and projecting into the bottom end of its respective uplift conduit, a pair of ring-shaped tube sheets disposed at vertically spaced positions around each said uplift conduit within its respective leg and a plurality of elongate tubes extending vertically between each pair of said tube sheets to form a boiler for the flow of particulate solids therethrough, and a ring-shaped baffle disposed in each said leg below its respective boiler sloping toward its respective uplift conduit so that the inner periphery of said baffle is adjacent the bottom end of its respective uplift conduit, said uplift conduits being disposed in a pattern adapted to discharge uplifted particulate solids substantially uniformly over the horizontal cross-section of said vessel and said deck providing lateral support for said uplift conduits to hold said uplift conduits in substantially vertical alignment with freedom of said uplift conduits to move vertically with changes due to thermal expansion.

2. A reactor for circulating a mass of solid particles therethrough which comprises a vertically elongated vessel having a closed top head and a plurality of tubular legs in fluid comunication with the bottom of said vessel, an open conduit disposed in each of said legs and extending upwardly through said vessel to a level spaced below said top head, each said conduit being fastened solely by its bottom end to the bottom end of its respective leg with its walls and said bottom end spaced from the walls and bottom end of said respective leg, a fluid inlet disposed in the bottom end of each said leg and discharging into the bottom end of its respective conduit, each said leg and its respective uplift conduit being cylindrical and forming an annular space therebetween, an annular boiler disposed in said annular space, said boiler having a plurality of vertical tubes in parallel for the flow of said solid particles therethrough, said tubes being supported by upper and lower spaced tube sheets, a frusto-conical baffle disposed in each said leg below its respective boiler sloping toward its respective uplift conduit, said baffle providing an annular space below its respective boiler for the collection of said solid particles and another annular space below said baffle, the inner periphery of said baffle being positioned adjacent the bottom end of its respective uplift conduit, an inlet for supplying a fluid stream to said annular space below said baffle, and a plurality of fluid-conveying horizontal decks at spaced levels in said vessel, each said deck comprising at least one box beam with one end thereof in fluid communication through a wall of said vessel with a fluid port, and a multiplicity of parallel rectilinear channels spaced from one another and disposed at substantially right angles to and in fluid communication with said box beam, said channels being in fluid communication with said vessel.

3. The reactor of claim 2 wherein each of said channels consists of imperforate top and side walls and has gas flow communication with said reactor through its bottom.

4. The reactor of claim 2 wherein said channels are in fluid communication with said box beam through openings in a wall of said box beam, said openings being graded and arranged so that the channel nearest to said fluid port has the smallest opening and the channel farthest from said fluid port has the largest opening.

5. The reactor of claim 2 wherein guide elements are provided for each conduit passing through each deck whereby said deck maintains said conduit in substantially vertical alignment while permitting said conduit to move vertically with changes due to thermal expansion.

6. The reactor of claim 2 wherein each deck is provided with a ring channel encircling each conduit passing through said deck, the inner walls of said ring channel being spaced from the outer walls of the encircled conduit to leave a space for the flow of solid particles therethrough.

References Cited in the file of this patent

UNITED STATES PATENTS

| | | | |
|---|---|---|---|
| 2,440,475 | Jacomini | Apr. 27, | 1948 |
| 2,486,229 | Utterback | Oct. 25, | 1949 |
| 2,542,887 | Watson | Feb. 20, | 1951 |
| 2,557,842 | Ruthruff | June 19, | 1951 |
| 2,625,467 | Barker | Jan. 13, | 1952 |
| 2,672,407 | Leffer | Mar. 16, | 1954 |